Figure 1:
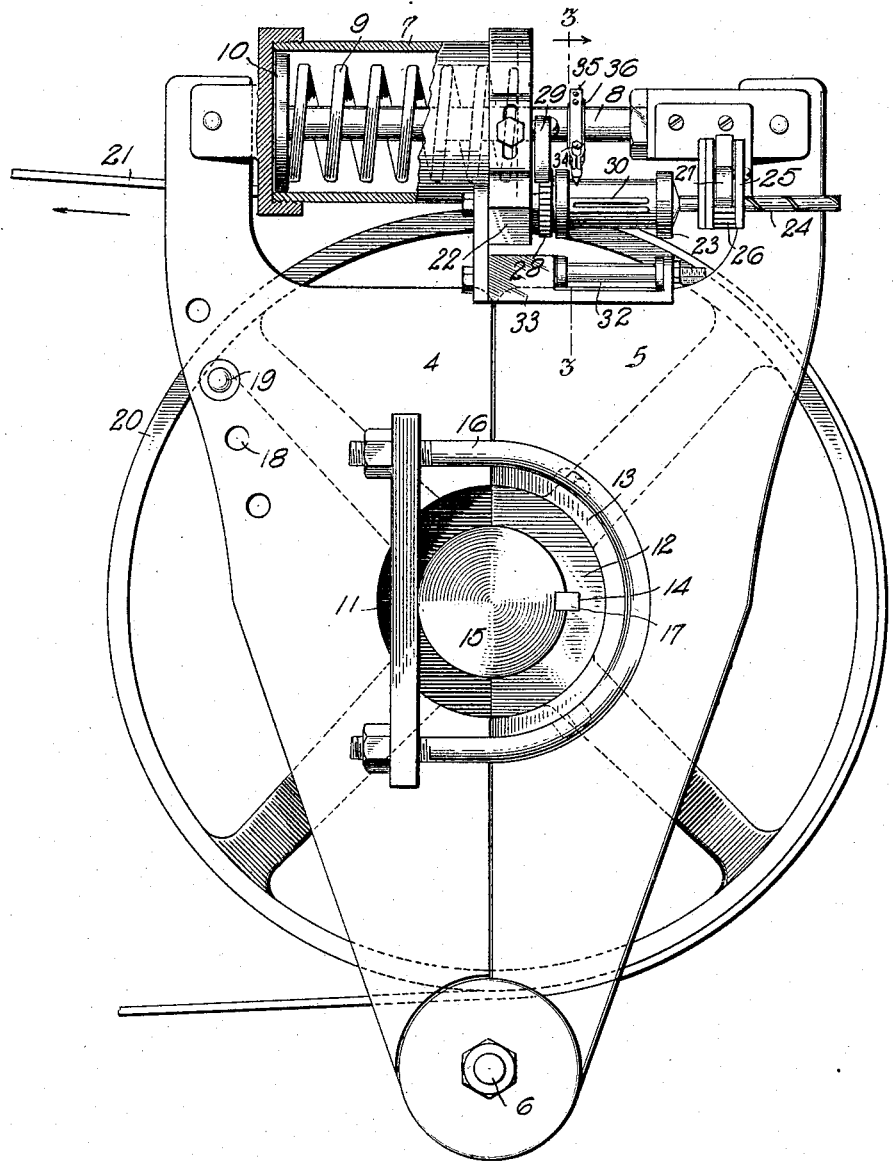

W. R. KLECKNER.
DYNAMOMETER.
APPLICATION FILED OCT. 21, 1915.

1,204,883.

Patented Nov. 14, 1916.
2 SHEETS—SHEET 1.

WITNESSES

INVENTOR
W. R. Kleckner
BY
ATTORNEYS

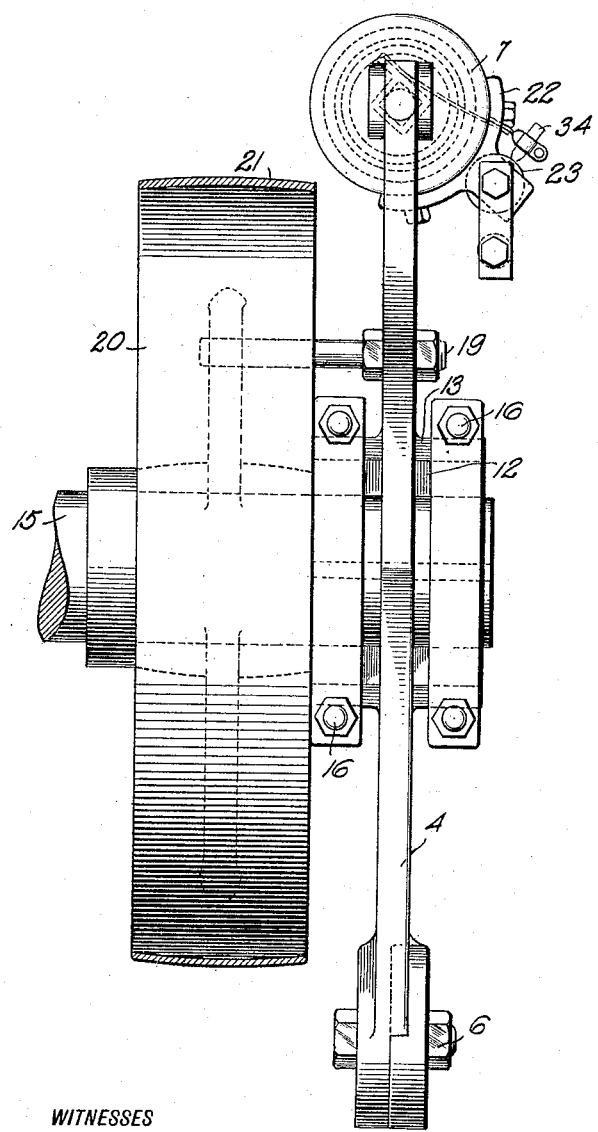
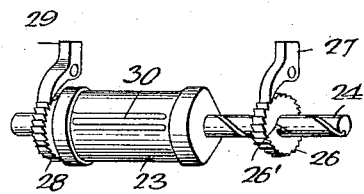
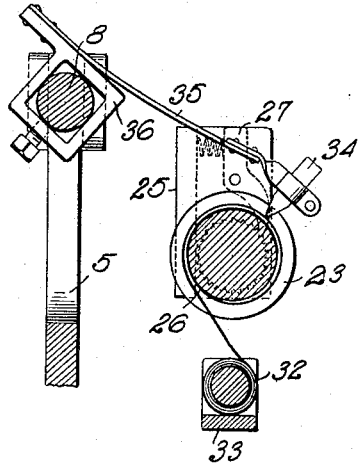

UNITED STATES PATENT OFFICE.

WILLIAM R. KLECKNER, OF COWELL, CALIFORNIA.

DYNAMOMETER.

1,204,883.  Specification of Letters Patent.  Patented Nov. 14, 1916.

Application filed October 21, 1915. Serial No. 57,078.

*To all whom it may concern:*

Be it known that I, WILLIAM R. KLECKNER, a citizen of the United States, and a resident of Cowell, Contra Costa county, in the State of California, have invented a new and Improved Dynamometer, of which the following is a full, clear, and exact description.

My invention relates to a dynamometer, and is particularly adapted for measuring graphically the tension of flexible power-transmitting members, such as chains and belts.

The object of the invention is to provide a simple, strong, efficient and inexpensive device which can be easily and quickly applied to a drive for measuring the tension in the flexible power-transmitting member.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of my dynamometer as applied to a flexible drive, a portion of the dynamometer being broken away to show the details of construction; Fig. 2 is an end elevation of the dynamometer and drive; Fig. 3 is an enlarged section on line 3—3, Fig. 1; and Fig. 4 is a perspective diagrammatic view of the chart-carrying cylinder and the pawl-and-ratchet mechanism associated therewith.

Referring to the drawings, 4 and 5 are the halves of the dynamometer frame. A bolt 6 connects pivotally the halves at one end. At the other end the half 4 carries a barrel 7 which is pivotally connected thereto with one end of the barrel. A rod 8 is pivotally connected with one end thereof to the opposite end of the half 5 of the frame, said rod projecting into the barrel. A coil spring 9 is provided in the barrel about the rod 8, one end of said spring abutting against one end of the barrel, while the other end of said spring abuts against a disk or head 10 provided at the end of the rod within the barrel. The tendency of the spring 9 is to draw the halves of the frame together.

An opening 11 is formed in the halves 4 and 5 of the frame between the ends thereof so that half of the opening is in each of the halves of the frame. The half of the opening in the half 5 of the frame is bordered by a collar 13 which forms a seat for a semi-cylindrical bushing 12 to fit the proper size of shaft 15 to which the device is to be attached. The bushing 12 has a keyway 14 which is adapted to coöperate with the keyway of the shaft to which the device is secured through the medium of U-shaped bolts 16. The bolts 16 tie the half 5 of the frame to the shaft 15, while the half 4 is free from the shaft. The key 17 prevents the turning of the half 5 on the shaft. The half 4 is provided with a plurality of openings 18 into which a bolt 19 may be secured to project into the path of the spokes of a pulley 20 mounted to revolve on the shaft whereby the half is coupled to the pulley. A belt 21 which engages the pulley will force the half 4 of the frame away from the half 5 of the frame when power is transmitted through the belt to the pulley in the direction of the arrow in Fig. 1. The displacement of the half 4 of the frame from the half 5 of the frame will be proportioned to the power applied to the belt and, consequently, to the tension caused in the belt.

A bracket 22 is adjustably secured to the barrel 7. A cylinder 23 is rotatably mounted in the bracket but is prevented from moving axially relative to said bracket. The cylinder has an extension 24 which projects through a bracket 25 secured to the rod 8. A ratchet 26 is mounted within the bracket and is threaded on the extension 24 of the cylinder. A spring-actuated pawl 27 is mounted within the bracket 25 to engage the ratchet 26. The cylinder 23 has a ratchet 28 secured adjacent the bracket 22, engaged by a spring-actuated pawl 29. The effect of the ratchets 26 and 28 on the cylinder is opposite.

The cylinder 23 is provided with a clip 30 for gripping paper tape 31 carried by a bobbin 32 which is rotatably mounted in a support 33 secured to the bracket 22 and maintained by said support in proper relation with the cylinder 23. A tracing member 34 is maintained above the cylinder through the medium of a resilient member 35 on the rod 8. The position of the tracing member 34 may be adjusted relative to the cylinder by means of a clamp 36 to which the resilient member 35 is secured. As the belt 21 forces the half 4 of the frame away from the half 5 of the frame the spring 9 is compressed. The movement of the barrel 7 carries therewith the cylinder 23. The pawl 27 leaves the ratchet 26 freedom to turn as the threaded part of the extension 24 is moving through the ratchet 26 when the cylinder is moving away from the ratchet 26 because of the direction of the thread. The cylinder 23 is prevented from turning by the engagement of the ratchet 28 with the pawl 29. As the tension on the belt 21 is decreased, the spring 9 causes reproachment of the frame halves. This reproaching movement causes the extension 24 to move through the ratchet 26, but the ratchet 26 is prevented from turning by its engagement with the pawl 27, thereby causing the cylinder 30 to revolve; and this is not prevented by the engagement of the pawl 29 with the ratchet 28. This displacement of the cylinder will wind the tape from the bobbin 32 on to the cylinder 23. A further change in tension of the belt will repeat the cycle above described. It will be noted that an increase in tension will draw a line on the tape parallel to the elements of the cylinder, while a decrease in tension will draw a line diagonal to the elements of the cylinder.

By means of the above described dynamometer the tension of flexible transmission in pounds of power is measured graphically. The factor of chain tension is determined by the dynamometer and multiplied by the chain speed, and the result divided by the constant will give the mechanical horse power.

By means of the above dynamometer the number of dumps or loads discharged by an automatic weighing scale can be measured by attaching the dynamometer to the moving belt on to which the loads are discharged. The rise and fall of belt tension caused by the intermittent discharge of weighed materials will be graphically registered.

While I have described the principle of operation, together with the device which I now consider to be the best embodiment thereof, I desire to have it understood that the device shown is merely illustrative and that such changes may be made as are within the scope of the appended claims.

I claim:

1. A dynamometer comprising a pair of frame members pivotally connected to each other at one end, yielding means connecting said frame members at the other ends, means whereby one of said frame members may be secured to a shaft, means for securing the other frame member to a member revoluble on said shaft, tape-supporting means associated with said yielding means, means for marking the tape on the supporting means associated with said yielding means, means for causing the said tape-supporting means to revolve when said frame members are moving toward each other under the action of said yielding means, and means for preventing the rotation of said tape-supporting means when said frame members are caused to part.

2. A dynamometer comprising a pair of relatively movable frame members, yielding means normally resisting the movement of said members, a revoluble tape support associated with said yielding means, means for marking the tape on the support, means for revolving the tape support operable by the movement of said frame members under the action of said yielding means, and means for preventing the rotation of said tape support when said frame members are moving away from each other.

3. A dynamometer comprising a pair of relatively movable frame members, yielding means resisting the movement of said members from each other, a rotatable tape support mounted to participate in the movement of one of said members, a tracing device for marking the tape on the support mounted to participate in the movement of the other frame member, means preventing the rotation of the rotatable support in a predetermined direction, and means for causing the rotation of said support in the opposite direction.

4. A dynamometer comprising a pair of relatively movable frame members, yielding means resisting the parting movement of said members, a revoluble tape support mounted to participate in the movement of one of said members, a tracing member mounted to coöperate with said support and adapted to participate in the movement of the other frame member, a pawl and ratchet associated with the support for preventing the rotation of said support when said frame members are parting, a threaded extension from said tape support, a ratchet threaded on said extension, means preventing said ratchet from moving laterally when the extension moves longitudinally, and a pawl for the ratchet preventing the rotation thereof when said frame members are moved under the action of the yielding means and whereby said tape support is caused to rotate.

5. The combination of a shaft, a member revoluble thereon and a flexible drive for said member, with a dynamometer for measuring the tension of the flexible drive comprising a pair of frame members pivotally connected at one end, means for connecting one frame member to the shaft, means for securing the other frame member to the revoluble member, a barrel carried pivotally at the other end of one frame member, a rod pivotally carried by the other end of the other frame member and engaging the barrel, a coil spring within the barrel on said rod, a disk on the rod within the barrel engaged by one end of the spring, the other end of the spring engaging the opposite end of the barrel and whereby the two frame members are drawn together by said spring, a revoluble tape support carried by said barrel, means for preventing the rotation of the tape support when the frame members are caused to part, means for rotating said support operable by the expansion of the spring, and a tracing member carried by the rod in coöperative relation with the tape support.

6. The combination of a shaft, a member revoluble thereon and a flexible drive for said member, with a dynamometer for measuring the tension of the flexible drive comprising a pair of frame members pivotally connected at one end, compressible means associated with the other end of one of the frame members, means associated with the other end of the other frame member engaging the compressible means, a revoluble tape support mounted to participate in the movement of one of said members, a tracing member mounted to participate in the movement of the other frame member and disposed coöperatively with the tape support, means for preventing the rotation of the tape support when the frame members are caused to part, means for rotating said tape support operable by the movement of the frame members toward each other, means for connecting one frame member to the shaft, and means for securing the other frame member to the member revoluble on the shaft.

In testimony whereof I have signed my name to this specification in the presence of two subscribing witnesses.

WILLIAM R. KLECKNER.

Witnesses:
  D. S. SEE,
  J. E. BUTLER.

Copies of this patent may be obtained for five cents each, by addressing the "Commissioner of Patents, Washington, D. C."